R. B. LOVE.
VEHICLE WHEEL.
APPLICATION FILED SEPT. 3, 1910.

996,493.

Patented June 27, 1911.

2 SHEETS—SHEET 1.

Witnesses
H. A. Stock.
H. C. Schroeder

Inventor
Robert B. Love.
By C. C. Vrooman
Attorney

R. B. LOVE.
VEHICLE WHEEL.
APPLICATION FILED SEPT. 3, 1910.
996,493.
Patented June 27, 1911.
2 SHEETS—SHEET 2.
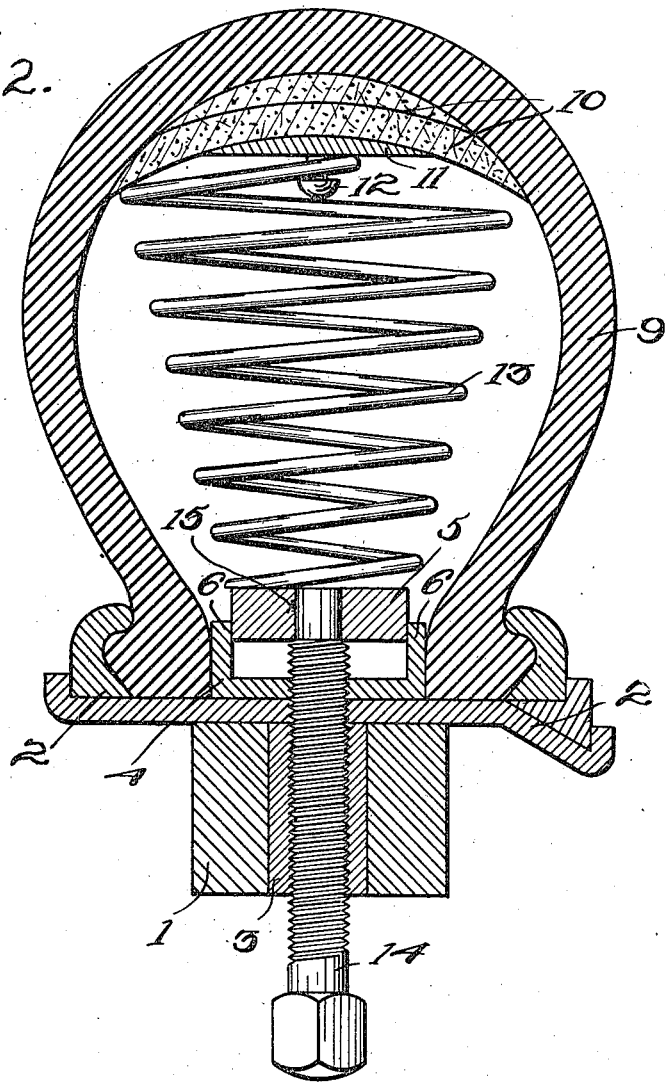
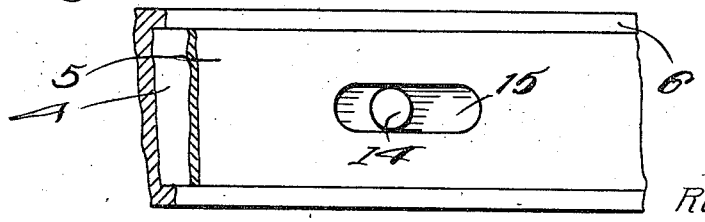
Inventor
Robert B Love.
Witnesses
Attorney

UNITED STATES PATENT OFFICE.

ROBERT B. LOVE, OF ANTIOCH, CALIFORNIA.

VEHICLE-WHEEL.

996,493.  Specification of Letters Patent. Patented June 27, 1911.

Application filed September 3, 1910. Serial No. 580,329.

*To all whom it may concern:*

Be it known that I, ROBERT B. LOVE, a citizen of the United States, residing at Antioch, in the county of Contra Costa and State of California, have invented certain new and useful Improvements in Vehicle-Wheels, of which the following is a specification.

This invention relates to tires and the principal object of the same is to provide a tire which will have the same resiliency as a pneumatic tire, but, at the same time, will not be affected by punctures thereby doing away with the inconvenient experience by having a flat tire.

This invention is illustrated in the accompanying drawings, wherein—

Figure 1:
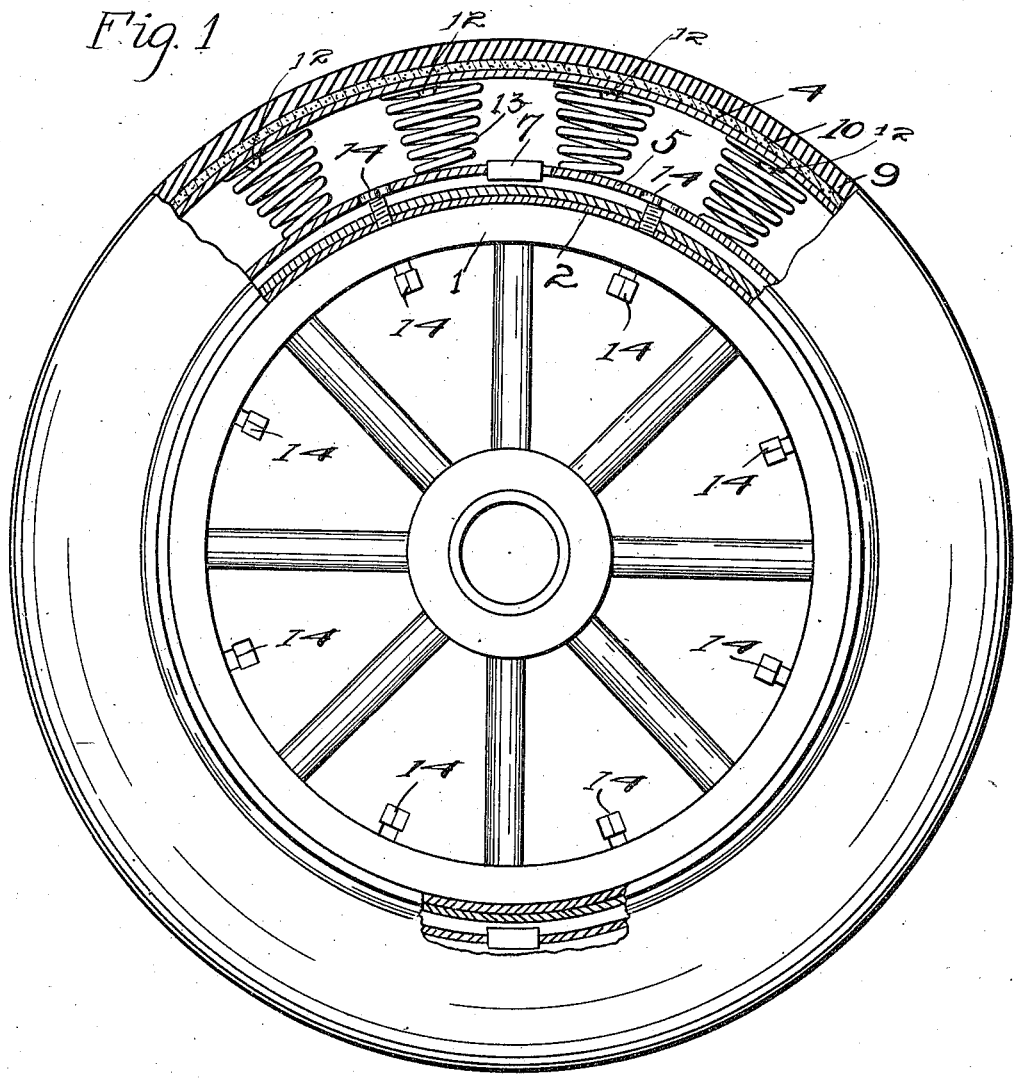
Figure 3:
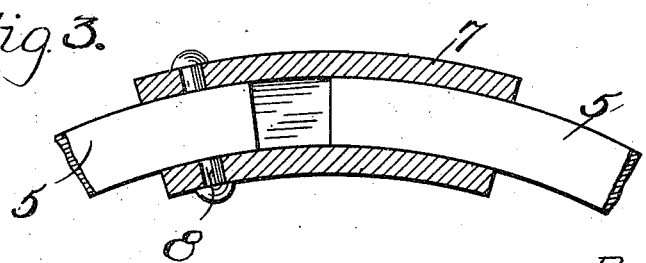

Figure 1 is a perspective view of a wheel a portion of the tire being broken away to show the attachment within the tire. Fig. 2 is a sectional view through the tire and rim showing how the improved attachment is mounted within the tire. Fig. 3 is a view showing how the supporting bands are connected together. Fig. 4 is a view showing the slot formed in the supporting band to permit the longitudinal adjustment of the same.

In the accompanying drawings the numeral 1 designates a felly which is supplied with the usual rim 2. The rim may be of any desired construction but one practical example being illustrated. The felly of the wheel is provided at points centrally located between the spokes with internally threaded sleeves 3. A channel plate 4 is secured to the rim 2 and the rim and channel plate are provided with threaded openings which register with the threaded opening through the sleeves 3. A pair of semi-circular bands 5 are mounted between the sides 6 of the channel plate 4. The ends of the bands 5 are joined together by means of the sleeves 7. The sleeves 7 are rigidly secured to the ends of one of the bands 5 by means of the rivets 8 while the end of the other band is slidably mounted within the other ends of the sleeve as clearly shown in Fig. 3. A tire casing 9 is secured to the rim in the ordinary manner. The inner portion of the tire casing, however, comes in contact with the channel plate 4 and the tire casing is thus kept from being pushed from the rim when the springs are tightened. The tire casing is provided with rings of leather 10 which are mounted within the tire and beneath the tread portion. A metal band 11 is fastened to the rings of leather by means of rivets 12, the heads of which protrude beyond the metal band. A series of spiral springs 13 are secured at their outer ends to the rivets 12 and at their inner ends rest upon the band 5. A threaded bolt 14 is passed through the openings formed through each of the sleeves 3 and the rim 2 and channel plate 4. The inner end of the bolt is not threaded and is rotatably mounted within a longitudinal slot 15 formed in the band 5.

After the tire has been placed within the rim the bolts 14 are turned so as to compress the springs 13. This causes an outward pressure to be applied to the tire and will hold the same distended the same as air would. The bands 5 are slidably connected together in order that when the pressure is applied to the springs the bands may be able to expand. It should be noted that by having the band 5 made in two parts that the springs are prevented from being drawn out of shape as would be the case if the band were made of one piece and severed at a single point. By having the band supplied with the longitudinal slots, it can have a certain amount of longitudinal adjustment which would not be possible if it were supplied with circular openings. It should also be noted that the band 11 helps to keep the tire in shape and when the springs 13 are compressed also acts as a spring.

Having described my invention, what I claim is:—

A rim, a tire carried thereby, a channel plate seated upon the rim, an adjusting screw passing through the rim and plate and terminating in a reduced end extension, semicircular bands seated in said plate and slidable therein, said bands being provided with slots that engage on the end extensions of said screws, springs interposed between said bands and the inner surface of the tire, and sleeves carried by one end of each band to slidably engage the end of the other band.

In testimony whereof I affix my signature in presence of two witnesses.

ROBERT B. LOVE

Witnesses:
H. C. SCHROEDER,
F. P. SCHROEDER.